US006691205B2

(12) United States Patent
Zilberman

(10) Patent No.: US 6,691,205 B2
(45) Date of Patent: Feb. 10, 2004

(54) METHOD FOR USING RAM BUFFERS WITH SIMULTANEOUS ACCESSES IN FLASH BASED STORAGE SYSTEMS

(75) Inventor: Eugene Zilberman, Richmond Hill (CA)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 165 days.

(21) Appl. No.: 09/797,580

(22) Filed: Mar. 5, 2001

(65) Prior Publication Data

US 2002/0124129 A1 Sep. 5, 2002

(51) Int. Cl.[7] .............................................. G06F 12/00
(52) U.S. Cl. .................. 711/103; 711/150; 365/185.33; 365/189.04; 710/53; 710/61
(58) Field of Search .................................. 711/103, 150, 711/168; 365/185.33, 189.04, 228–229; 345/557, 545; 714/48; 710/52–61

(56) References Cited

U.S. PATENT DOCUMENTS

| 5,359,569 A | * | 10/1994 | Fujita et al. | 365/229 |
| 5,412,612 A | * | 5/1995 | Oyama | 365/228 |
| 5,438,549 A | * | 8/1995 | Levy | 365/229 |
| 5,559,952 A | * | 9/1996 | Fujimoto | 345/557 |
| 5,623,447 A | * | 4/1997 | Shimoda | 364/189.04 |
| 5,928,370 A | * | 7/1999 | Asnaashari | 714/48 |
| 6,016,472 A | * | 1/2000 | Ali | 704/500 |
| 6,418,506 B1 | * | 7/2002 | Pashley et al. | 711/103 |

FOREIGN PATENT DOCUMENTS

JP  64-074649  *  3/1989  ........... G06F/13/10

* cited by examiner

Primary Examiner—Nasser G. Moazzami
(74) Attorney, Agent, or Firm—Mark M. Friedman

(57) ABSTRACT

A method and system for increasing read and write performance of flash-based storage systems, by using RAM buffers with multiple accesses. The increase of read and write performance of flash-based storage system is achieved by performing "from RAM" and "to RAM" transfer operations simultaneously. According to the preferred embodiment of the present invention, the invention provides a system for enabling simultaneous data transfer from a host interface to flash media and from flash media to a host interface. It also provides for a system for synchronizing memory-to-host and flash-to-memory transfers, during the host read operation. There is further provided a system of synchronizing host-to-memory and memory-to-flash transfers, during the host write operation.

3 Claims, 6 Drawing Sheets

METHOD FOR USING RAM BUFFERS WITH SIMULTANEOUS ACCESSES IN FLASH BASED STORAGE SYSTEMS

BACKGROUND OF INVENTION

1. Introduction and Field

The present invention relates to a method for using RAM buffers with multiple accesses in flash-based storage systems. Such RAM buffers enable improved read and write performance of flash-based storage systems, achieved by overlapping read and write operations to the RAM.

2. Prior Art

Using flash memory as a storage media commonly has the 2 following features:

1. Data written to flash generally should be protected by error detection codes and/or error correction codes (EDC/ECC). When the data is read from the flash, EDC/ECC allow the system to determine whether an error is present, and optionally to correct it. The correction can take place in any part of the EDC/ECC-protected data, and therefore should be done in random-access memory, Hence data cannot be sent directly to the host interface (such as SCSI or ATA bus), and should first be read into the RAM. Following this process the EDC/ECC status should be examined. In the case where the EDC/ECC status indicates no error, the data can be passed along. If the EDC/ECC mechanism indicates a correctable error, a corrective action should be taken before passing data further. If the EDC/ECC mechanism indicates an uncorrectable error, this error can optionally be passed to the host interface.

2. A write operation to the flash can also fail. However, this failure can be hidden from the host interface (such as SCSI, or ATA) by writing data onto another location. In order to repeat the write operation, data arriving from the host interface should be placed into the RAM buffer prior to commencing the write operation.

These 2 features inhibit direct data transfer between the host interface and the flash media. Using memory buffer as an intermediary normally takes two consecutive transfer operations: one to the memory and one from the memory. The necessity for these two consecutive data transfers is usually accepted as a necessary evil, and is therefore operative in most flash based storage systems.

There is thus a widely recognized need for, and it would be highly advantageous to have, a system that can enable both operations to and from the memory buffer simultaneously.

The present invention describes a method of performing these two transfer operations simultaneously in a flash-based storage system, thus improving the read and write performances of the system. The system of the present invention is differentiated from known alternative technologies and solutions due to the following factors:

i) The synchronization of host-to-memory and memory-to-flash transfers, and the correct recovery from different flash-related failure operations are complicated to implement, as described in present invention.

ii) Using a RAM buffer as an intermediary for the read and write operations is common, whereas the specific described method of performing these transfer operations simultaneously with a plurality of RAM buffers is unique in flash-based systems, and is thus innovative.

iii) The present invention enables the increase of sustained read and write performance practically twofold.

BRIEF DESCRIPTION OF THE DRAWINGS

The invention is herein described, by way of example only, with reference to the accompanying drawings, wherein.

SUMMARY OF THE PRESENT INVENTION

The present invention relates to a method and system for substantially improving read and write performance of flash-based storage systems, using a plurality of RAM buffers with multiple accesses. The increase of read and write performance of flash-based storage system is achieved by performing "from RAM" and "to RAM" transfer operations simultaneously.

According to a preferred embodiment of the present invention, the invention provides a system for enabling simultaneous data transfer between host interface and intermediate RAM Buffer and between the intermediate RAM Buffer and the flash media, comprising:

1. A processing system for enabling interaction with a host system;
2. At least one flash memory device for data storage;
3. Optional means for performing Error detection by calculating syndromes or checksum or CRC (Cyclical Redundancy Checking) of the data written into flash memory and data read from flash.
4. Optional means for performing Error correction of the data read from flash memory; and
5. At least two RAM components with separate data buses allowing simultaneous read and write operations on each RAM component.

According to further features of the present invention, there is provided a system for synchronizing memory-to-host and flash-to-memory transfers, during the host read operation.

In addition there is provided a system for synchronizing host-to-memory and memory-to-flash transfers, during the host write operation.

According to further features of the present invention, there is provided a method for synchronizing memory-tohost and flash-to-memory transfers in a solid state storage system, during the host read operation.

In addition there is provided a method for synchronizing host-to-memory and memory-to-flash transfers in a solid state storage system, during the host write operation.

It should be understood by someone who is skilled in the art of solid state storage system development, that the inventive methods and systems described herein may be used to develop further embodiments. The above mentioned embodiments are to be seen as examples, and are in no way meant to limit the technology described herein to these examples alone.

DETAILED DESCRIPTION OF THE PRESENT INVENTION

The present invention relates to a method and system for improving performance of flash-based storage system, by using a plurality of RAM buffers with multiple accesses.

More specifically, the present invention relates to a system that performs "from RAM" and "to RAM" transfer operations simultaneously.

Figure 1:
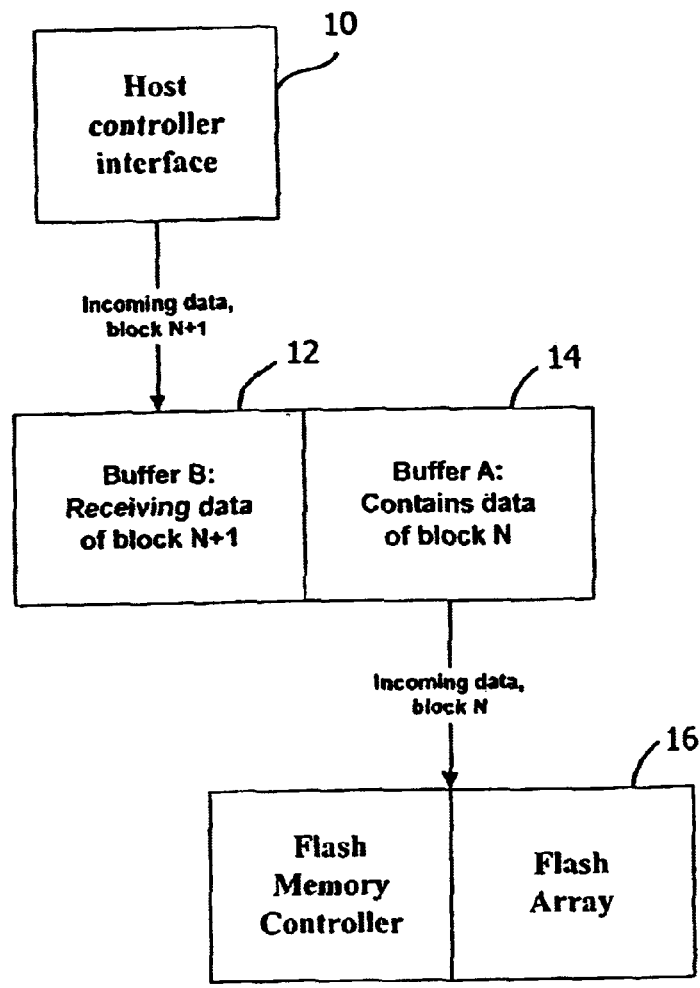
FIG. 1 is an example of a system which receives new data from the host interface to one memory buffer and simultaneously writes the preceding portion of the new data from another memory buffer into flash memory.
Figure 2:
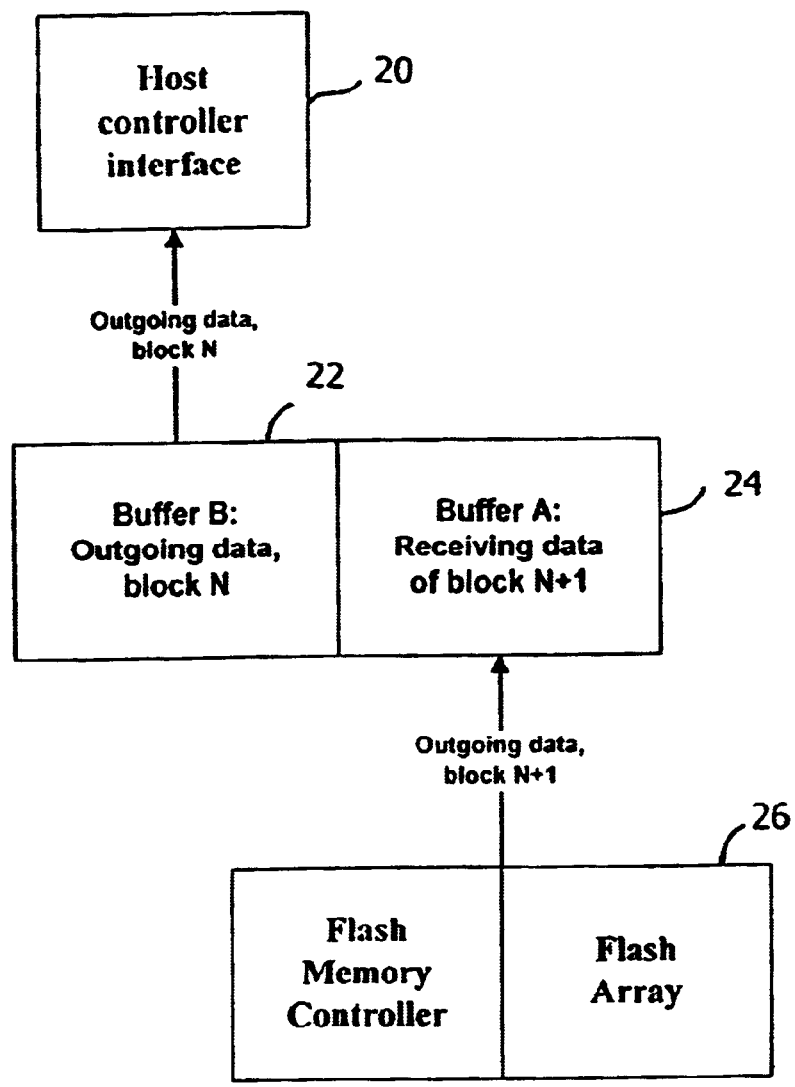
FIG. 2 is an example of a system which sends data to the host interface from one memory buffer and simultaneously receives the next portion of the data (to be sent) from the flash to another memory buffer.

The principles and operation of the system and a method according to the present invention may be better understood with reference to the drawings and the accompanying descriptions, it being understood that these drawings are given for illustrative purposes only and are not meant to be limiting, wherein:

FIGS. 1 and 2 show the operation of such a system, according to the present invention. FIG. 1 is an example of a system which receives new data from the host interface 10 to one memory buffer 12 and simultaneously writes the preceding portion of the new data from another memory buffer 14 into the flash memory 16. FIG. 2 is an example of a system which sends data to the host interface 20 from one memory buffer 22 and simultaneously receives the next portion of the data (to be sent) from the flash 26 to another memory buffer 24.

In reference to FIGS. 1 and 2, the intermediate memory consists of either 2 or more (A, B, C . . . ) logically independent memory buffers. By logical independence, it is intended that one buffer can be written into, while simultaneously, the other buffer can be read from. Physically, these buffers can be either memory components with multiplexed buses, or dual-port-RAM components. The memory components may be either separate chips, or parts of a larger integrated component. In the case of dual-port-RAM implementation, memory buffers are designated non-overlapping regions of memory inside the dual-port-RAM.

In the case where the data of a system's logical block N is written (FIG. 1) onto the flash media from memory buffer A, the data of logical block N+1 is being simultaneously received from the host interface to the memory buffer B. Here and in the following descriptions, the "logical block" stands for one or more host system transfer units (sectors). The size of the "logical block" is determined by the convenience and performance of the flash operations. For example in the case of AND or NAND-technology flash, it could be set to the page size of the used flash array. The stream of data transferred from the host is viewed by the storage system as a sequence of logical blocks N, N+1, N+2, etc.

If there are only 2 logically independent memory buffers, upon completion of the data transfer into B, software should wait for the completion of the flash write operation from A and inspect the flash write status. If the write operation has failed, it can be retried at another place of the flash media. When the write operation is successful, memory buffer A can be considered empty and, two new simultaneous transfers can be initiated: block N+1 from the memory buffer B to the flash media and block N+2 from the host interface to the memory buffer A.

Figure 5:
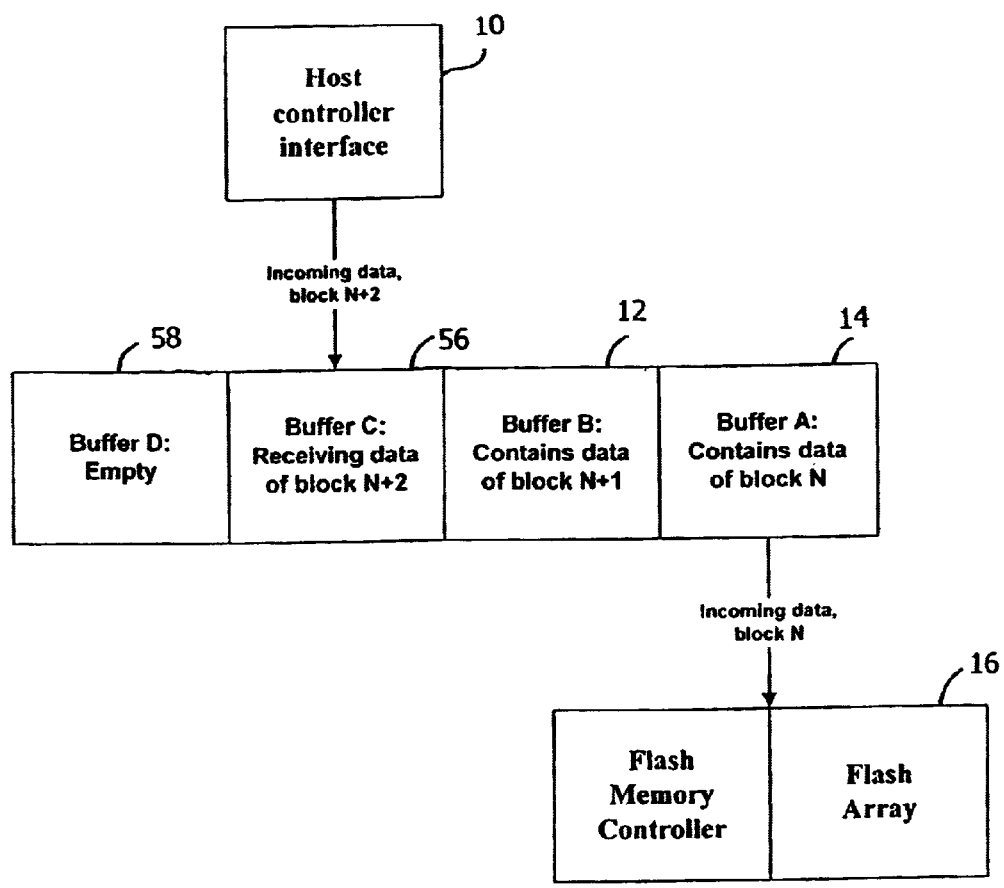
FIG. 5 is similar to FIG. 1, except that the system illustrated has more than two memory buffers.

If there are more than 2 logically independent memory buffers, new transfers into the memory can be started without waiting for completion of the flash write or retry operations. The new data will be received to the available empty memory buffers, C 56, D 58, and so on, as can be seen in FIG. 5. If all the empty memory buffers have been used, the waiting for completion of the flash write or retry operations shall be performed, in order to empty another memory buffer, for reception of further new data.

The data which has not yet been written successfully to the flash media (i.e. which write status has not yet been received) should not be replaced, as it may be needed to retry the failed write operation.

It should also be noted that if the size of the host system transfer unit (sector) is different from the flash array's access unit size ('page' in some flash technologies), the system should either record which part of the data has not been transferred from the host during the write procedure, or read this part from the flash media, possibly into the memory buffer prior to the transfer.

In case when the data of a system's logical block N+1 is read (FIG. 2) from the flash media 26 to the memory buffer A 24, the data of logical block N is simultaneously sent to the host interface 20 from the memory buffer B 22.

If there are only 2 logically independent memory buffers, upon completion of the data transfer from B, software should wait for completion of the read operation to the buffer A, then check the EDC/ECC status of the read data. If the EDC/ECC mechanism (be it software or circuitry) indicates a correctable error, a corrective action can be taken upon the data in memory buffer A, and if the EDC/ECC mechanism indicates an uncorrectable error, that error can optionally be passed to the host interface. If the correct data has been read or the corrupted data has been successfully corrected, a 'read' command should be issued to the flash media for the next logical block, and the flash system should wait for the new data, in order to be ready for transfer if needed. Then two new simultaneous transfers can be initiated: block N+1 from the memory module A to the host interface and block N+2 from the flash media to the memory module B.

Figure 6:
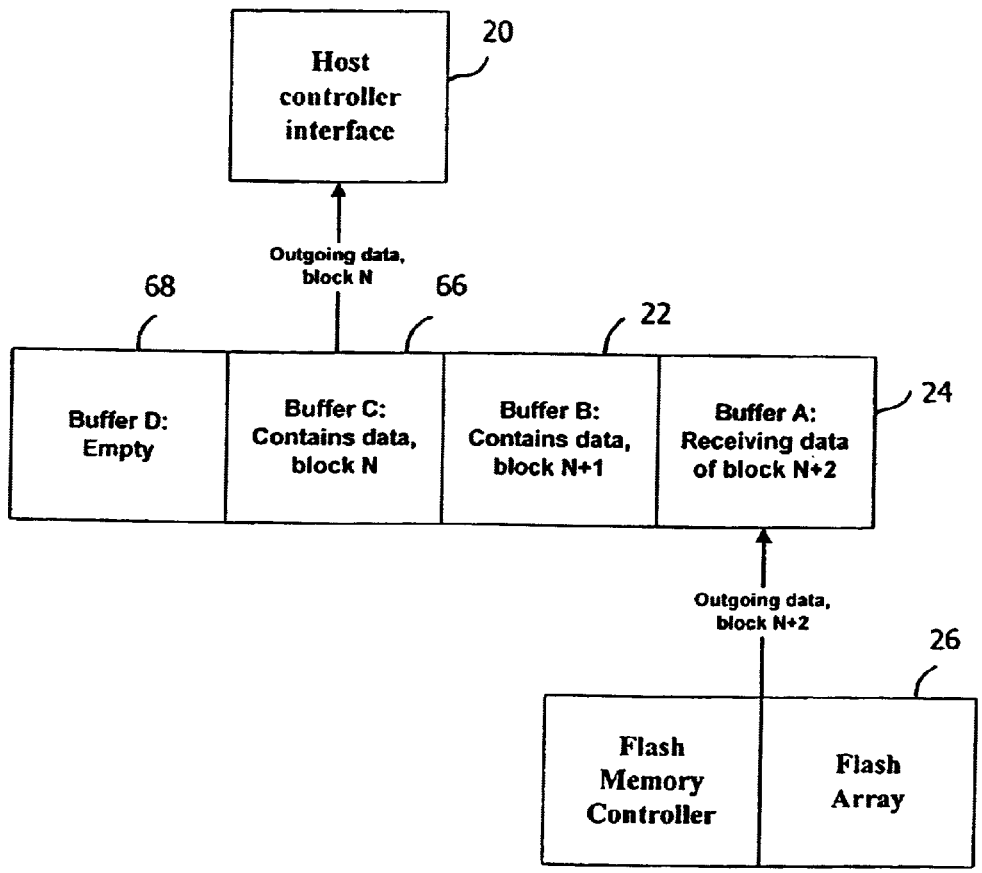
FIG. 6 is similar to FIG. 2, except that the system illustrated has more than two memory buffers.

If there are more than 2 logically independent memory buffers, new transfers into the memory can be started without waiting for completion of the transfer to host. The new data will be placed into the available empty memory buffers C 66, D 68, and so on, as can be seen in FIG. 6. If all empty memory buffers have been used, the waiting for completion of the transfer to host operation shall be executed, in order to empty another memory buffer, for reading of the following user data. The data which has not yet been successfully transmitted to the host should not be replaced.

In order to improve the read and write performances of the system the two transfer operations (to and from the memory buffers) should be truly simultaneous, which means that two different data buses will be operational simultaneously. That is of course only possible if the number of logical blocks transferred to or from the host during a particular read or write operation is more than 1.

Figure 3:
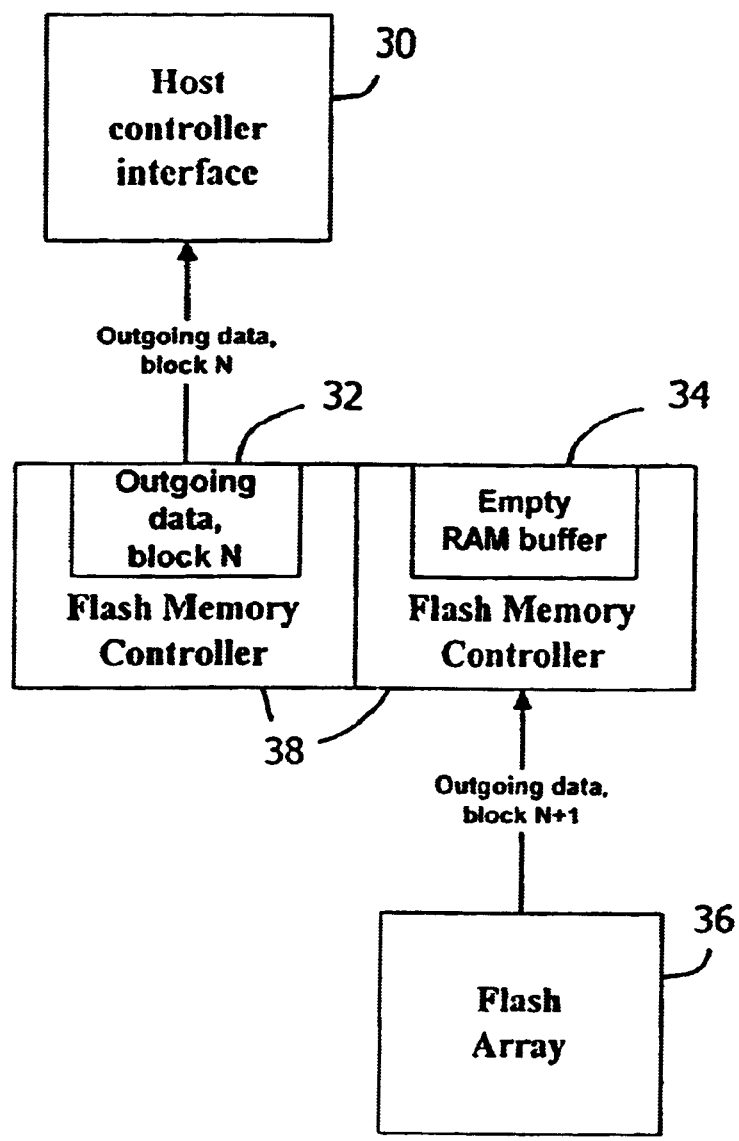
FIG. 3 is an example of a system which sends data to the host interface from one memory module and simultaneously receives the next portion of the data (to be sent) from the flash to another memory module. This system is similar to the system in FIG. 2, with the distinction that memory modules are located inside the flash memory controller.

FIG. 3 is an example of a system which sends data to the host interface 30 from one memory module 32 and simultaneously receives the next portion of the data (to be sent) from the flash 36 to another memory module 34. This system is similar to the system in FIG. 1, with the distinction that memory modules are located inside the flash memory controller 38.

Figure 4:
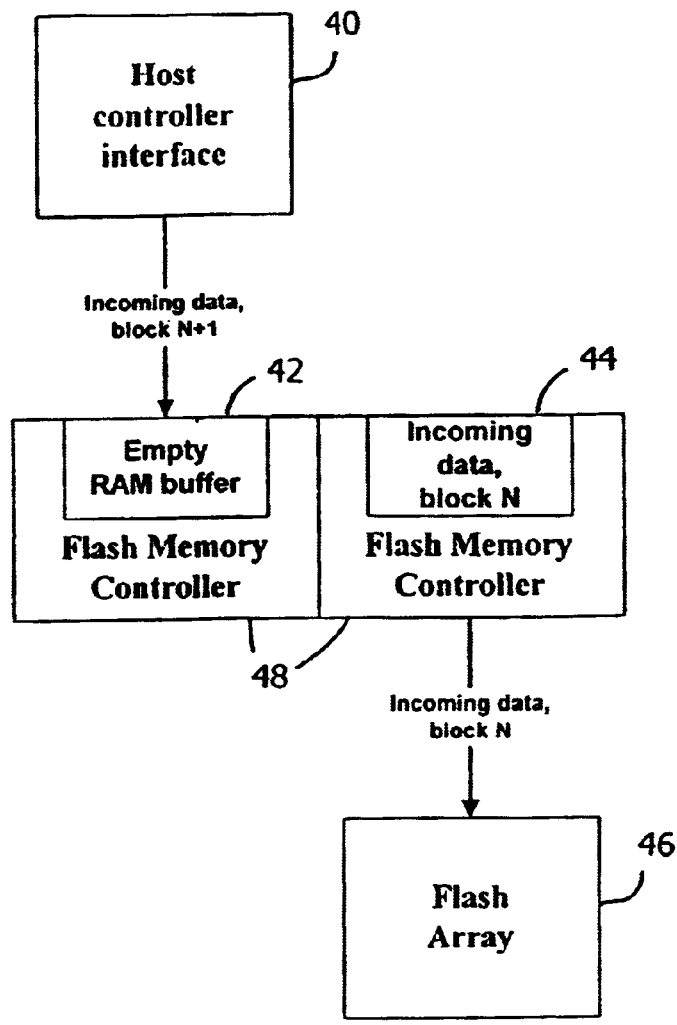
FIG. 4 is an example of a system which receives new data from the host interface to one memory module and simultaneously writes the preceding portion of the new data from another memory module into flash memory. This system is similar to the system in FIG. 1, with the distinction that memory modules are located inside the flash memory controller.

FIG. 4 is an example of system which receives new data from the host interface 40 to one memory module 42 and simultaneously writes the preceding portion of the new data from another memory module 44 into flash memory 46. This system is similar to the system in FIG. 2, with the distinction that memory modules are located inside the flash memory controller 48.

The preferred embodiment of the present invention incorporates a system for synchronizing memory-to-host and flash-to-memory transfers, during the host read operation. This system comprises:

i. Memory register or variable (the term "memory register" in this context may include use of the term "variable") for each memory buffer, which indicates the status of the buffer, where the status can be 'empty', 'in process of data reception', 'contains data of the logical block N' and, 'contains corrupted data of the logical block N'.

ii. Memory-to-host control thread which, for each logical block N of data, part of which is to be transferred to the host, awaits for some memory buffer to acquire status of 'contains the data of the logical block N', and then initiates the data transfer of the user data to the host, upon the completion of the transfer, marks that memory buffer as 'empty'. The term, 'Control Thread', here and elsewhere, relates to the software or hardware control flow related to a particular task.

iii. Flash-to-memory control thread which for each logical block N of data, part of which is to be transferred to the host, awaits for some memory buffer to acquire status of 'empty', optionally marks that memory buffer as 'in process of data reception', then issues read command to the flash memory device which contains the data. When the flash device is ready to produce the data, the control thread initiates the data transfer of the user data from the flash to the memory buffer. Upon the completion of the transfer, the thread examines the data correctness status calculated by the ECC/EDC mechanism (software or circuitry). If the data is corrupted but can be corrected, a correction algorithm can be employed. If the data residing in the buffer is correct or has been corrected, the thread marks that memory buffer as 'contains data of the logical block N', otherwise it marks that memory buffer as 'contains corrupted data of the logical block N'.

iv. The flash-to-memory control thread operates independently from the memory-to-host control thread, either truly simultaneously or with preemption of control. The synchronization between the control threads is performed using the registers or variables of the RAM Buffer status. The process of changing this memory register or variable by a thread should be atomic, in the sense that other threads will only see the whole result of the change, and can not see the partially changed status.

The preferred embodiment of the present invention further incorporates a system for synchronizing host-to-memory and memory-to-flash transfers, during the host write operation. This system comprises:

i. Memory register or variable for each memory buffer which indicates the status of the buffer, where status can be 'empty', 'in process of data reception' or 'contains data of the logical block N'.

ii. Host-to-memory control thread which for each logical block N of data, part of which is to be transferred from the host, awaits for some memory buffer to acquire status of 'empty', optionally marks that memory buffer as 'in process of data reception', and then initiates the data transfer of the user data from the host, upon the completion of the transfer marks that memory buffer as 'contains the data of the logical block N'. If the data transferred from host does not coincide with flash array's access unit size ('page' in some flash technologies) then the thread reads from the flash the contents of the parts of the page which have not been transferred from the host.

iii. Memory-to-flash control thread which for each logical block N of data, part of which has been transferred from the host, awaits for some memory buffer to acquire status of 'contains the data of the logical block N', then issues write command(s) to the flash memory device(s) in accordance with the flash storage algorithm. If the write command fails, the data can be written again, possibly multiple times, possibly to different locations of the flash media, in accordance with the flash storage algorithm. If the user data has been successfully written on flash, the thread marks that memory buffer as 'empty', otherwise the host should be notified about the host write command failure.

iv. This memory-to-Flash control thread operates independently from the host-to-memory control thread, either truly simultaneously or with preemption of control. The synchronization between the control threads is performed by the registers or variables of the RAM Buffer status. The process of changing this memory register or variable by a thread should be atomic in the sense that other thread will only see the whole result of the change, and can not see the partially changed status.

In a further preferred embodiment of the present invention, the configuration for such a system includes the memory module inside each flash memory controller, as shown on FIGS. 3 and 4. FIG. 3 is an example of system which sends data to the host interface from one memory module and simultaneously receives the next portion of the data (to be sent) from the flash to another memory module. The system is similar to the system in FIG. 2, with the distinction that memory modules are located inside the flash memory controller. FIG. 4 is an example of a system which receives new data from the host interface to one memory module and simultaneously writes the preceding portion of the new data from another memory module into the flash memory. This system is similar to the system in FIG. 1, with the distinction that memory modules are located inside the flash memory controller. This can considerably simplify the design of the system. Of course, a combination of all mentioned configurations can also be implemented.

According to an alternative preferred embodiment of the present invention, these memory buffers may also serve as part of a data cache system. For example, after the data has been transferred to the host during a Read operation or has been received from host during Write operation, and if the host during subsequent Read operation requests the same data, the same data left in the buffer may be transferred to the host without accessing the flash memory. Alternatively, after the data has been received from host during Write operation, it may be left in the buffer for some time without writing it onto the flash media. This is referred to as being transferred directly to/from the host.

While the invention has been described with respect to a limited number of embodiments, it will be appreciated that many variations, modifications and other applications of the invention may be made.

What is claimed is:

1. A system for synchronizing memory-to-host and flash device-to-memory data transfers in a solid state storage system, during the host read operation comprising:
   i. said memory comprising a plurality of memory buffers for storing data between the host system and the flash device;
   ii. A memory register for each said memory buffer, for indicating status of that buffer, such that said status is used for synchronization of memory-to-host and flash-to-memory control threads;
   iii. A memory-to-host data transfer control thread, for initiating data transfer of user data to a hosts, and, upon completion of said data transfer, for marking said one of the plurality of memory buffers as empty; and
   iv. A flash-to-memory control thread for issuing a read command to the flash memory device which contains data, subsequently, when the flash device is ready to produce data, initiating data transfer of user data from the flash to said one of the plurality of memory buffers;
   wherein said status indicates a current state of each memory buffer, including:
      (a) an empty state, which is available for reception of new data;
      (b) a state whereby the system contains data of a particular logical block; and
      (c) a state whereby the system contains corrupted data of said particular logical block.

2. A system of synchronizing host-to-memory and memory-to-flash device data transfers in a solid state storage system, during the host write operation, comprising:
   said memory comprising a plurality of memory buffers for storing data between the host system and the flash device;
   ii. A memory register for indicating status for each said memory buffer; such that said status is used for synchronization of host-to-memory and memory-to-flash control threads;
   iii. A host-to-memory data transfer control thread, which for each particular logical block of data, part of which is to be transferred from the host, awaits for a memory buffer to acquire an empty status, and then initiating a data transfer of user data from said host, such that on completion of said data transfer, said data transfer control thread marks that memory buffer as containing the data of said particular logical block; and
   iv. A memory-to-flash data transfer control thread which for each particular logical block of data, part of which has been transferred from said host, awaits for a memory buffer to acquire a status of containing the data of said particular logical block, issuing at least one write command to at least one of the flash memory device in accordance with a flash storage algorithm;
   wherein said status indicates a current state of each memory buffer, including:
      (a) an empty state, which is available for reception of new data; and
      (b) a state whereby the system contains data of a particular logical block.

3. A system of synchronizing host-to-memory and memory-to-flash device data transfers in a solid state storage system, during the host write operation, comprising:
   i. said memory comprising a plurality of memory buffers for storing data between the host system and the flash device;
   ii. A memory register for indicating status for each said memory buffer; such that said status is used for synchronization of host-to-memory and memory-to-flash control threads;
   iii. A host-to-memory data transfer control thread, which for each particular logical block of data, part of which is to be transferred from the host, awaits for a memory buffer to acquire an empty status, and then initiating a data transfer of user data from said host, such that on completion of said data transfer, said data transfer control thread marks that memory buffer as containing the data of said particular logical block; and
   iv. A memory-to-flash data transfer control thread which for each particular logical block of data, part of which has been transferred from said host, awaits for a memory buffer to acquire a status of containing the data of said particular logical block, issuing at least one write command to at least one of the flash memory device in accordance with a flash storage algorithm;
   wherein function of said host-to-memory data transfer control thread further comprises the step of:
      if the data transferred from said host does not coincide with access unit size of said flash device reading from the flash part the data contents which have not been transferred from said host.

* * * * *